April 9, 1968 P. G. ANDREWS 3,376,725
PRODUCTION MACHINE
Filed Nov. 4, 1964 12 Sheets-Sheet 1

INVENTOR.
Peter G. Andrews.
BY Harness Dickey & Pierce
ATTORNEYS.

April 9, 1968  P. G. ANDREWS  3,376,725
PRODUCTION MACHINE
Filed Nov. 4, 1964  12 Sheets-Sheet 5

INVENTOR.
Peter G. Andrews.
BY
Harness, Dickey & Pierce
ATTORNEYS.

April 9, 1968 P. G. ANDREWS 3,376,725
PRODUCTION MACHINE
Filed Nov. 4, 1964 12 Sheets-Sheet 7

INVENTOR.
Peter G. Andrews.
BY
Harness, Dickey & Pierce
ATTORNEYS.

April 9, 1968 P. G. ANDREWS 3,376,725
PRODUCTION MACHINE
Filed Nov. 4, 1964 12 Sheets-Sheet 9

INVENTOR.
Peter G. Andrews
BY
Harness, Dickey & Pierce
ATTORNEYS

United States Patent Office 3,376,725
Patented Apr. 9, 1968

3,376,725
PRODUCTION MACHINE
Peter G. Andrews, Kitchener, Ontario, Canada, assignor to Walker Manufacturing Company, a corporation of Delaware
Filed Nov. 4, 1964, Ser. No. 408,970
13 Claims. (Cl. 72—311)

ABSTRACT OF THE DISCLOSURE

This application discloses a machine for forming a plurality of circumferentially and longitudinally spaced louvered openings in a tubular member. The machine is comprised of a mandrel and associated louver forming device for forming a number of circumferentially spaced louvers in a tube supported around the mandrel. A work holding chuck is associated with a work feed device and is adapted to engage a tube and successively feed the tube to the louver forming device. A conveying device is interposed between the mandrel and the retracted position of the chuck for sequentially delivering a tube to the chuck whereby the tube may be succesively fed to the louver forming device by the work feeding apparatus. After the desired louvers are formed, the tube and chuck are returned to the retracted position and the louvered tube is removed by the conveying apparatus.

This invention relates generally to improvements in the metal forming art, and more particularly, to an apparatus for forming louvers or perforations in thin-walled tubular members.

It has theretofore been the practice in the fabrication of lourvered or perforated thin-walled tubular members to form the louvers or perforations within the tube stock prior to the stock being rolled into its tubular configuration. This procedure has been objectionable for several reasons, one of the most important of which is the relatively high tooling and die maintenance expenses involved. Another serious problem resulting from this method of fabricating tubular members is the necessity of providing some sort of a roll or lock seam arrangement along the length of the tube to rigidly secure the adjacent rolled edges together. This latter problem has been of particular concern in the automotive muffler field due to the difficulty involved in properly sealing the joints between the muffler bulkheads, partitions, headers, or the like, and the outer periphery of louvered or perforated tubular members incorporated therein.

It is accordingly a primary object of the present invention to provide an improved apparatus which is adapted to form a bank of louvers or perforations in a previously formed tubular member, thereby obviating the aforementioned tooling and related expenses involved in perforating or louvering tube stock prior to it being rolled into its final tubular configuration; this apparatus moreover enabling louvers or perforations to be formed in tubular members which have been fabricated as by extrusion or rolling and continuous welding, thereby permitting the production of louvered tubular members without the aforesaid objectional roll or lock seam arrangement formed thereon.

It is another object of the present invention to provide an apparatus of the above character which is completely automatic in operation.

It is still another object of the present invention to provide an apparatus of the above character that is of a relatively simple design and which therefore requires a relatively low capital expenditure.

It is yet another object of the present invention to provide an apparatus of the above character that may be easily installed, is of a rugged construction, and which is both smooth and dependable in operation.

In accordance with the principles of the present invention, the foregoing and other related objects and advantages are attained through a tube louvering apparatus having an oscillating piston assembly which functions to actuate a radially expandable louvering mandrel that is adapted to be inserted within the tubular workpieces, the expansion of this mandrel causing the workpiece to be pierced or perforated in predetermined areas to form the louvered openings therein. A variable speed rotary disc cam assembly is directly connected to the metering valve effecting oscillatory movement of the above piston assembly and is also connected to an adjustable hydraulic metering pump that is sequenced with the dwell time of the subject cam to selectively actuate another piston assembly that functions to index the tubular stock relative to the aforementioned expandable mandrel. The apparatus also includes means to selectively retain the tubular work stock within the apparatus and to feed individual tube members to a work station in the apparatus and to thereafter eject the louvered tube from the apparatus.

A more complete understanding of the present invention and other objects and features thereof will be obtained from the following detailed description taken in conjunction with the accompanying drawings, wherein:

FIG. 6 is a top elevational view of the structure illustrated in FIGURE 1, taken along the line 6—6 thereof;

FIG. 12 is an elevated perspective view of the structure illustrated in FIGURE 10, as seen in the direction of arrow 12 thereof;

FIG. 13 is a schematic representation of the control system of the tube louvering machine of the present invention;

Figure 16:
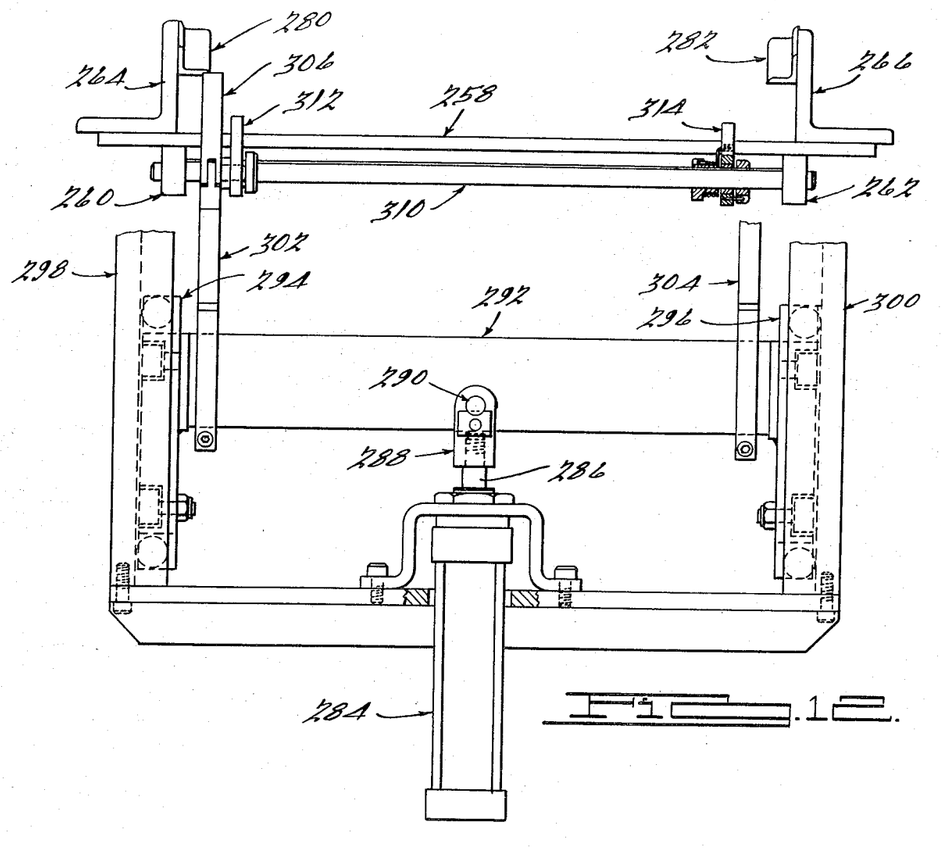
FIG. 16 is an enlarged perspective view of a tube louvered by the machine of the present invention.

Referring now in detail to the drawings, the reference numeral 5 indicates generally a section of a louvered tube formed by a tube louvering apparatus embodying this invention. The louvered tube 5 is comprised of a generally cylindrical section 6 in which a number of louvers 7 are formed. The louvers 7 are formed at spaced circumferential locations around the tube 5. In the depicted embodiment, the louvers 7 are formed in groups with the louvers in each group being coaxially aligned. In addition, the louvers 7 in adjacent groups are in line with each other in a direction parallel to the longitudinal axis of the tube 5. Each of the louvers 7 is formed from a segment of the cylindrical section 6 that is deformed outwardly and is sheared along one edge, indicated generally by the reference numeral 8, to define an open mouth 9, which extends generally in a circumferential direction.

Figure 1:
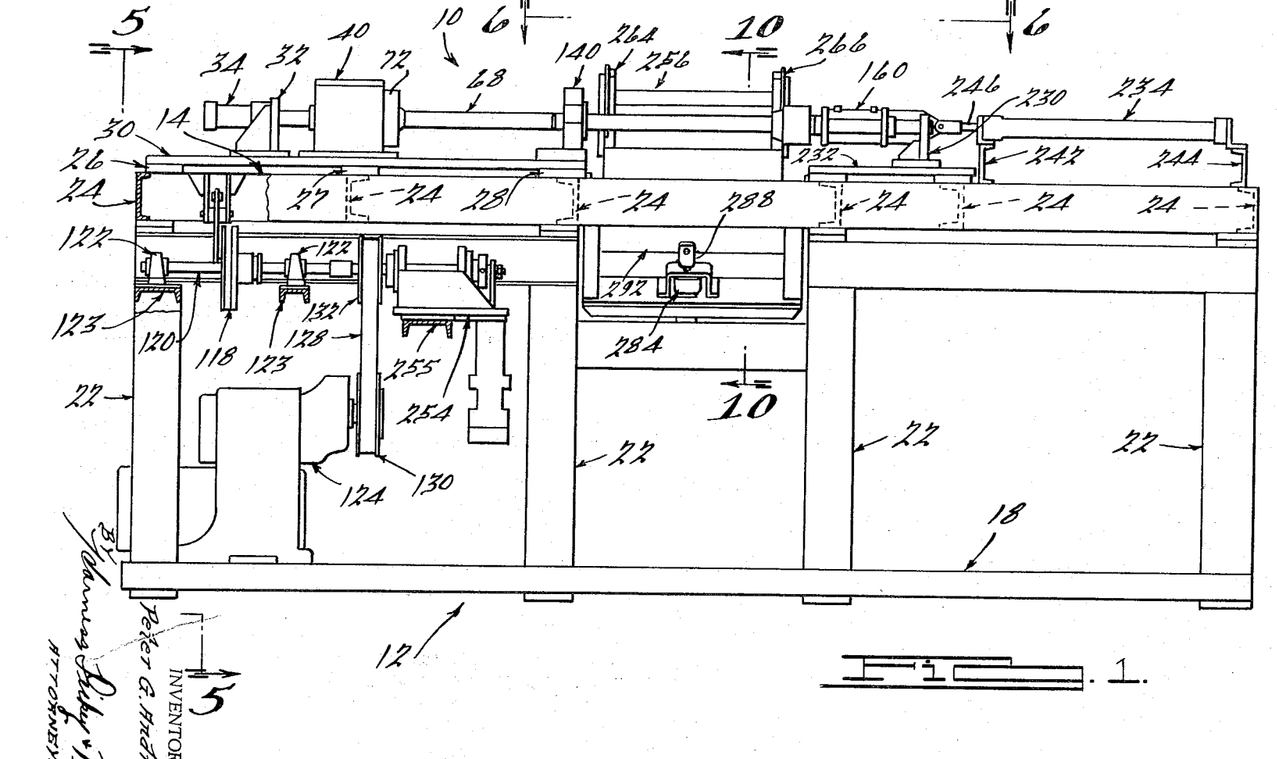
FIGURE 1 is a side elevational view of a preferred form of the tube louvering machine of the present invention.

Referring now to the remaining figures of the drawings, a tube louvering or perforating apparatus 10, in accordance with a preferred embodiment of the present invention, is shown as having a support structure, generally designated 12, which comprises a pair of spaced parallel and horizontally extending upper frame members 14 and 16 which are vertically spaced from and supported upon a second pair of spaced parallel and horizontally extending lower frame members 18 and 20 by a plurality of vertically extending leg members, generally designated 22. As best seen in FIGURE 1, a plurality of transversely extending support or cross members 24 extend between and are rigidly secured at their opposite ends to the upper frame members 14 and 16. The members 14, 16, 18, 20, 22 and 24 are constructed of conventional heavy gauge, C-shaped channel stock and are rigidly secured to one another as by welding or the like.

Figure 3:
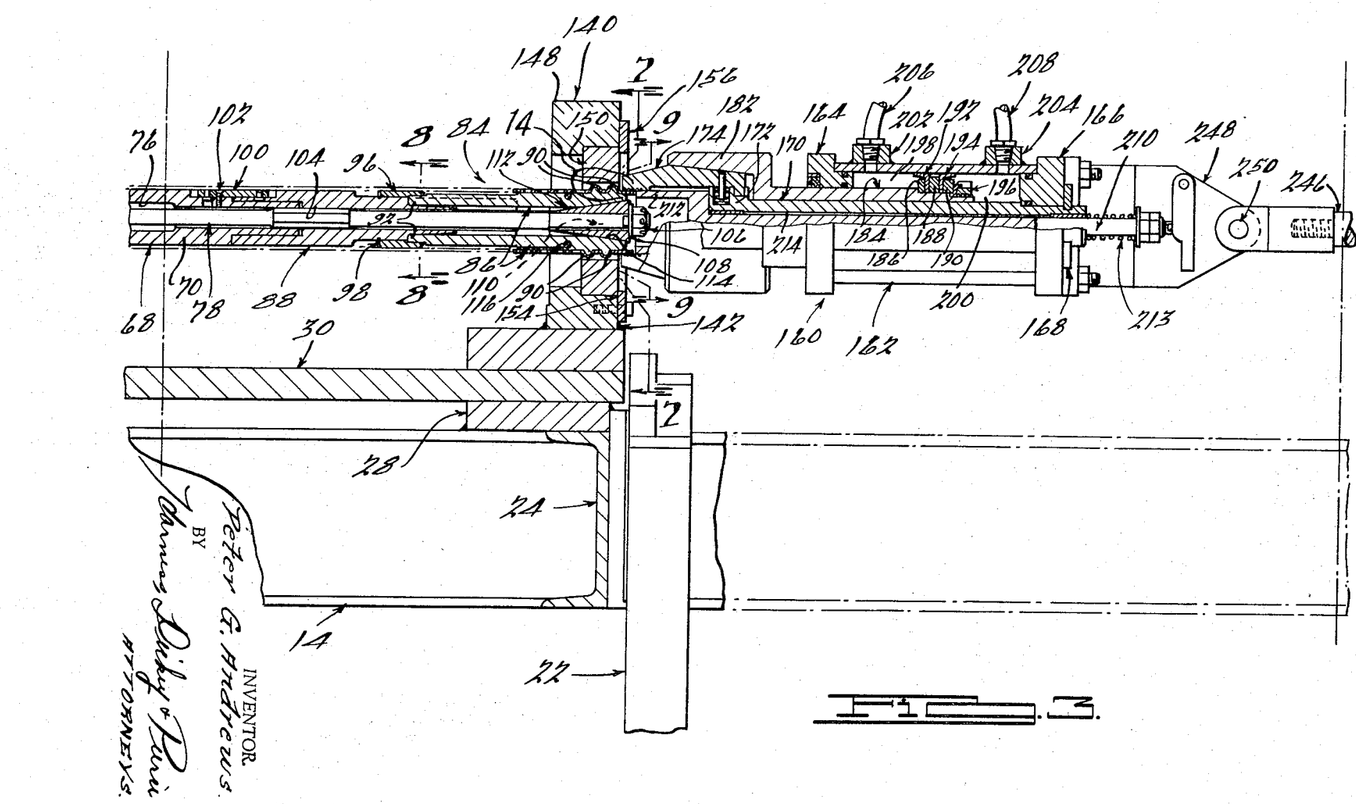
FIG. 3 is an enlarged side elevational view, partially broken away, of a continuation of the structure illustrated at the left end of FIGURE 2.
Figure 4:
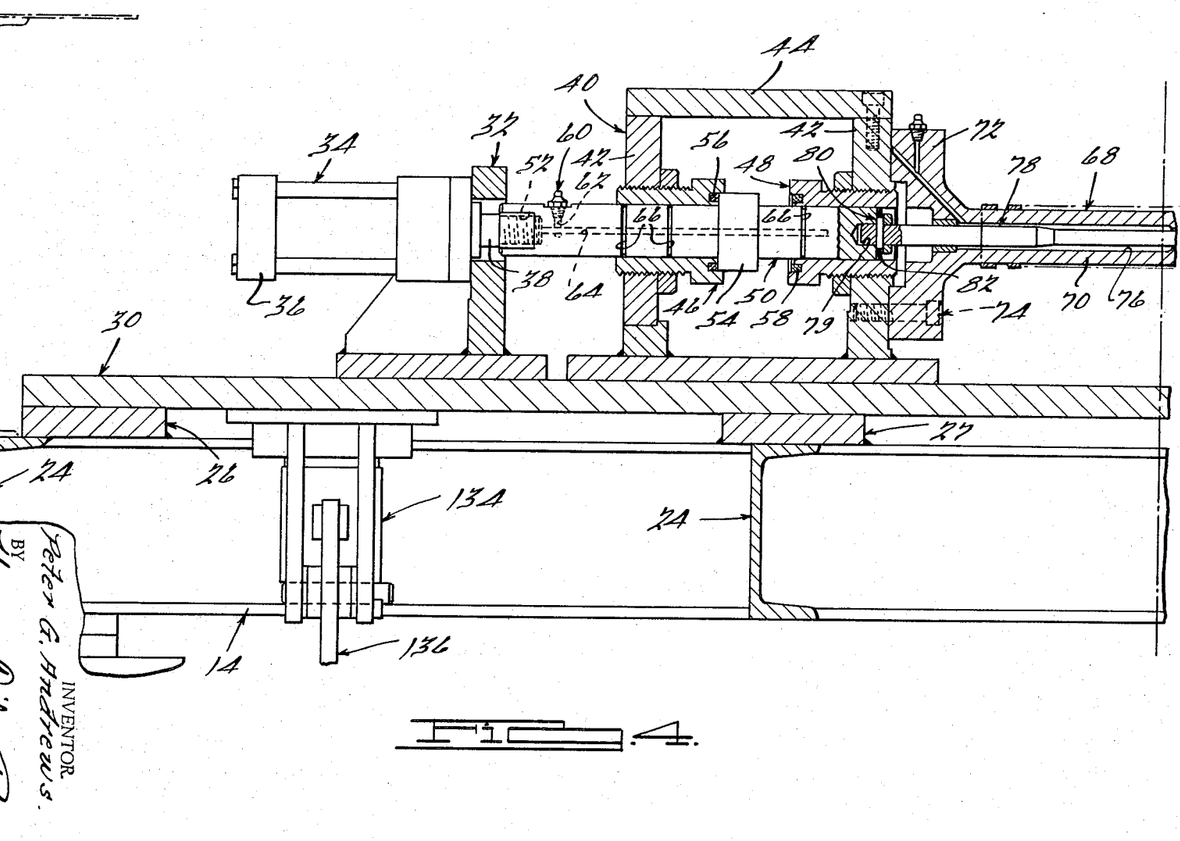
FIG. 4 is an enlarged side elevational view, partially broken away, of a continuation of the structure illustrated at the left end of FIGURE 3.

Referring now to FIGURES 1, 3 and 4, a plurality of flat elongated support plates 26, 27 and 28 extend horizontally between the frame members 14 and 16 and are supported upon three of the transversely extending cross members 24. Mounted upon the plates 26, 27 and 28 is a flat elongated support platform 30 which is coextensive between the frame members 14 and 16 and projects from one (left) end of the support structure 12 toward the medial portion thereof. Rigidly mounted on the upper surface of the platform 30 is a hydraulic cylinder support member 32 which serves to support a longitudinally extending hydraulic piston and cylinder assembly, generally designated by the numeral 34 and comprising a cylinder housing 36 and a hydraulic pressure responsive reciprocable piston rod 38. Also mounted on the upper surface of the platform 30 adjacent the member 32 is a rectangularly shaped lubricator housing, generally designated 40 and comprising upwardly extending side walls 42 and a horizontally extending cover member 44. Threadably mounted within the transversely extending side walls 42 of the housing 40 is a pair of aligned bushings 46 and 48 which journal support a reciprocating cylindrical shaft member 50 that is formed with an annular recess 52 at the left end thereof within which the right or outer end of the piston rod 38 is threadably secured. A medial portion of the shaft member 50 is formed with a radially outwardly extending shoulder portion 54 which is adapted to alternately and sealingly engage a pair of annular gasket members 56 and 58 which are respectively recessed within the innermost ends of the bushings 46 and 48, respectively. As best seen in FIGURE 4, a suitable lubricant fitting 60 is mounted in the upper side of the shaft 50, which fitting is communicable through suitable lubricant passages 62, 64 and 66 formed within and around the shaft 50 to the bearing surfaces defined by the inner periphery of the bushings 46 and 48 and the outer periphery of the shaft 50. Accordingly, a suitable lubricant may be transmitted to such bearing surfaces through the fitting 60 and passages 62, 64 and 66, thereby serving to minimize the frictional resistance imposed on the shaft 50 by the bushings 46 and 48.

Referring now to FIGURES 3 and 4, a tubular workpiece support mandrel, generally designated 68 and comprising a hollow elongated support portion 70 having a radially outwardly extending mounting portion 72 formed at one (left) end thereof, is rigidly secured, as by a plurality of bolts 74, to the transversely extending side wall 42 of the housing 40 within which the aforementioned bushing 48 is mounted. The mandrel 68 is secured to the wall 42 in a position such that a central bore 76 which extends axially through the mandrel 68 is coaxially aligned with the reciprocally mounted shaft member 50. Extending coaxially through the bore 76 and being reciprocally mounted therewithin is an elongated cylindrical actuating shaft or rod 78. The left end of the rod 78 is rigidly secured to the adjacent end of the shaft 50 by being nested within a central annular recess formed in the shaft 50, a diametrically extending lockpin 80 and snap-ring 82 being provided to lockingly secure these members together.

Figures 8, 9:
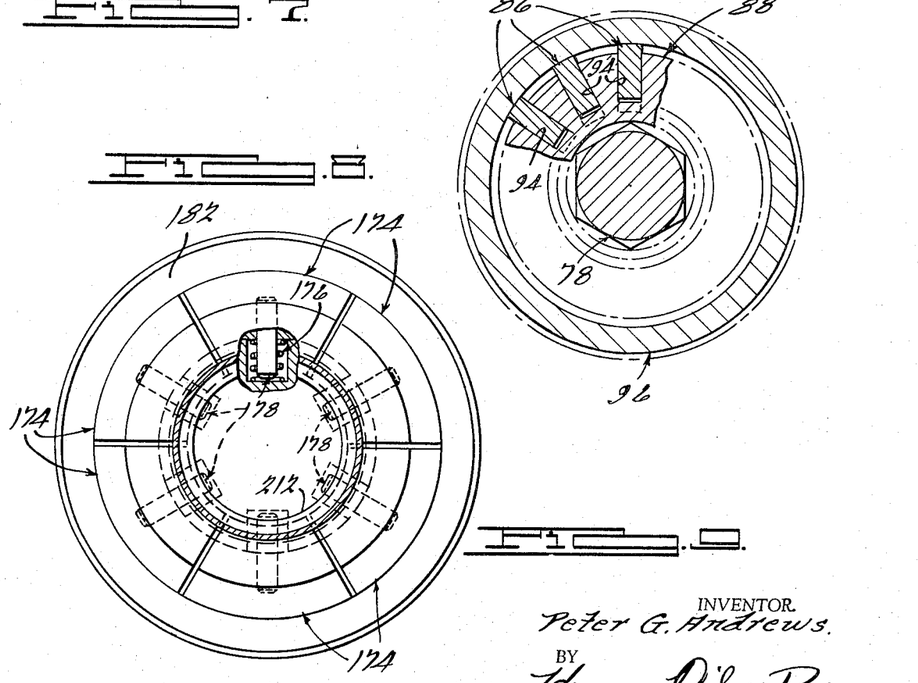
FIG. 8 is an enlarged cross sectional view taken along the line 8—8 of FIGURE 3.
FIG. 9 is an enlarged transverse cross sectional view taken along line 9—9 of FIGURE 3.

Mounted on the outer or right end of the support mandrel 68 is an expandable louvering mechanism, generally designated 84, which comprises a plurality of elongated louvering arms 86 that are arranged around the outer periphery of a hollow cylindrical central support member 88. Each of the arms 86 is formed with a pair of radially outwardly projecting louvering teeth 90 at one (right) end thereof, while the opposite (left) end of each of the arms 86 is formed with a semi-circular shaped and inwardly projecting pivot section 92. As seen in FIGURE 8, the central support member 88 is formed with a plurality of circumferentially spaced and longitudinally extending peripheral slots or grooves 94 within each of which is disposed one of the arms 86. The left ends of the arms 86 are pivotably secured to the central support member 88 by having the semi-circular pivot sections 92 thereof disposed within complementary recesses formed at the left ends of the aforediscussed grooves 94, which sections 92 are secured within the grooves 94 by an annular retaining ring 96 which extends around the outer periphery of the support member 88 and the left ends of the arms 86. A suitable snap-ring member 98 is provided to rigidly secure the retaining ring 96 in the position above described.

The left end of the central support member 88 is rigidly secured to the outer (right) end of the support mandrel 68 as by a suitable keyway 100 and screws 102 in a position such that the aforementioned actuating rod 78 extends through a central bore 104 that is formed within the support member 88. Rigidly secured on the outer (right) of the end of the actuating rod 78 by a suitable nut 106, retaining washer 108, and keyway 110, is a frustoconically shaped expanding cone 112 which is adapted to selectively and simultaneously engage the inner periphery of the outer (right) ends of each of the louvering arms 86, these ends, as best seen in FIGURE 3, being formed with tapered surfaces 114 of a complementary shape with respect to the conformation of the outer periphery of the expanding cone 112. A resilient and deformable annular garter spring 116 is disposed within an annular chamber defined by a plurality of radially aligned grooves formed in the outer periphery in each of the arms 86 adjacent the louvering teeth 90 formed therein, the spring 116 serving to resiliently urge the outer (right) ends of the arms 86 radially inwardly into engagement with the outer periphery of the expanding cone 112.

It will thus be seen that as the actuating rod 78 moves toward the left within the mandrel 68, the expanding cone 112 will simultaneously bias the right ends of the louvering arms 86 radially outwardly, whereby the louvering teeth 90 formed on the outer periphery on the arms 86 will be forced into engagement and pierce or louver a tubular workpiece supported coaxially upon the support mandrel 68. As the actuating rod 78 moves toward the right, the garter spring 116 will serve to bias the right ends of the louvering arms 86 out of engagement with the tubular workpiece, whereby this workpiece may be indexed or moved relative to the louvering mechanism 84 prior to the next louvering operation.

Figure 5:
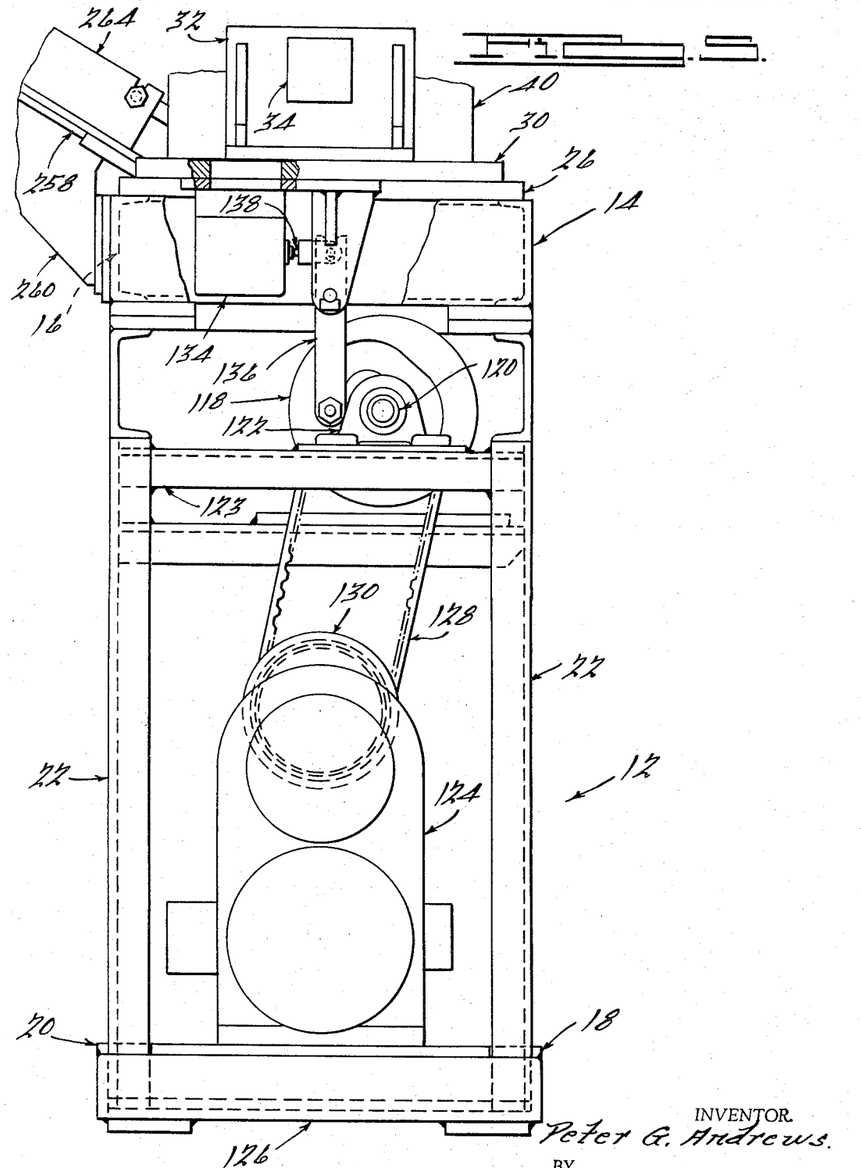
FIG. 5 is an enlarged transverse cross sectional view of the structure illustrated in FIGURE 1, taken along the line 5—5 thereof.

Referring now to FIGURES 1 and 5, reciprocal movement of the above described actuating rod 78 is achieved through the use of an eccentric cam member 118 which is rotatably mounted upon a shaft member 120 that extends longitudinally of the support structure 12 and is journal supported within conventional bushing members 122, which members 122 are supported upon a pair of longitudinally spaced and transversely extending cross members 123 located subjacent the support platform 30. Rotary movement of the shaft 120 and cam member 118 is provided by a variable speed electric motor, generally designated 124, that is mounted beneath the shaft 120 on suitable cross members 126 extending transversely between the lower frame members 18 and 20. Rotary movement is transmitted from the motor 124 to the shaft 120 by a conventional drive belt 128 that is mounted upon a pair of sheaves 130, 132 secured to the output shaft of the motor 124 and to the shaft 120, respectively. As best seen in FIGURE 5, a hydraulic valve control mechanism, generally designated 134, is rigidly secured to the lower side of the support platform 30 and is communicable with the aforedescribed piston and cylinder assembly 34 by means of conventional hydraulic conduits (not shown). The control valve mechanism 134 serves to pump hydraulic fluid to the piston assembly 34 in a manner such that the piston rod 38 thereof reciprocates to effect expansion and contraction of the aforedescribed louvering arms 86. The mechanism 134 is of a construction well known in the art and is actuated by a cam follower link 136 which is secured at its upper end to an actuating rod 138 protruding from the side of the mechanism 134, the opposite or lower end of the link 136 being secured in a conventional manner to the cam member 118, whereby the eccentricity of the cam member 118 will effect appropriate movement of the link 136 resulting in successive actuation of the control valve mechanism 134.

Figure 7:
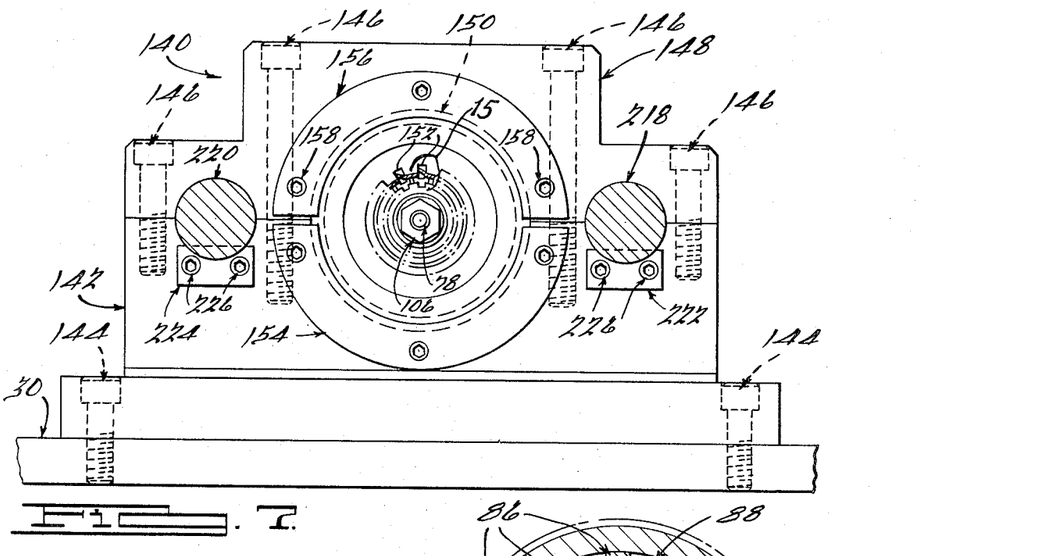
FIG. 7 is an enlarged transverse cross sectional view taken along the line 7—7 of FIGURE 3.
Figure 14:
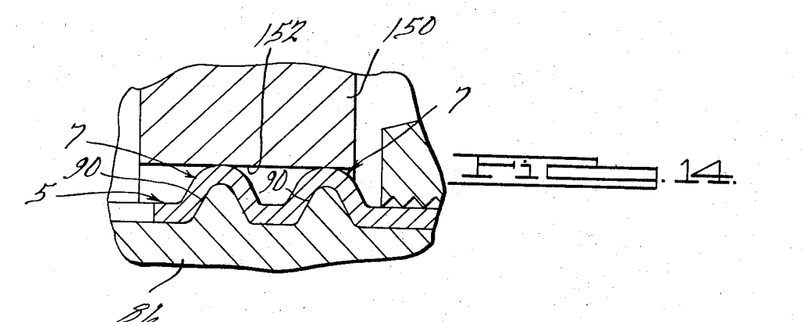
FIG. 14 is an enlarged cross-sectional view of the area encompassed by the circle 14 in FIGURE 3.
Figure 15:
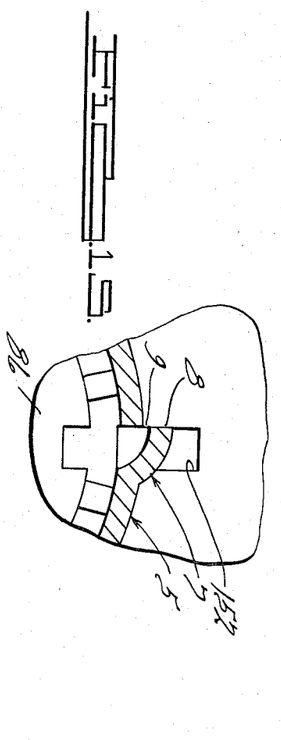
FIG. 15 is an enlarged cross-sectional view of the area encompassed by the circle 15 in FIGURE 7.

As best seen in FIGURES 3 and 7, mounted upon the support platform 30 in the same transverse or radial plane within which the louvering teeth 90 of the louver arms 86 are arranged, is a die support assembly, generally designated 140 and comprising a lower die support member 142 which is rigidly secured to the top of the platform 30 by a pair of suitable bolts 144. Mounted on the top of the lower die support member 142, as by a plurality of suitable bolts, generally designated 146, is an upper die support member 148 that defines, together with the lower member 142, an annular die support cavity aligned coaxially with the support mandrel 68 and supporting annular or ring-shaped die 150 therewithin. The inner periphery of the die 150 is formed with a plurality of circumferentially spaced grooves or notches 152 that correspond with and are radially aligned with the louver forming arms 86, the grooves or notches 152 serving to control the deformation of the tubular workpiece material adjacent each of the louvers being formed therein, as illustrated in FIGURE 7. The grooves or notches 152 extend axially through the die 150 as clearly shown in FIGURES 3 and 7 and their respective enlargements, FIGURES 14 and 15. Thus, as the louvers 7 are formed by the louver forming arms 86, the louvered tube 5 may be indexed through the die 150 without necessitating retraction of the die 150. The die 150 is rigidly secured within the support members 142 and 148 by a pair of semi-circular retaining members 154 and 156 that are secured to one side of the die 150 and rigidly attached to the support members 142 and 148 by suitable bolts 158.

Tubular workpieces are supported and indexed relative to the louvering arms 86 and the die 150 by means of a pneumatically actuated and longitudinally moveable chuck or collet assembly, generally designated 160. The assembly 160 comprises a hollow cylindrical housing 162 that is closed at its opposite ends by suitable header members 164 and 166. Extending coaxially through the housing 162 and being rigidly secured to the header 166 by a suitable retaining ring 168 is an elongated cylindrical shaft 170 whose left end is formed with an enlarged diameter section 172. Mounted around the outer periphery of the section 172 is a plurality of work stock engaging dogs, generally designated 174, that are formed at one end with suitable serrations or teeth for rigidly engaging the end of a tubular workpiece, as illustrated in FIGURE 3. The opposite ends of the dogs 174 are resiliently mounted upon the outer periphery of the shaft section 172 by means of suitable coil springs 176 and pins 178 that are seated within a plurality of circumferentially spaced recesses, generally designated 180 and illustrated in FIGURE 9. The left ends of the dogs 174 are enclosed within an annular sleeve section 182 formed on the left end of a hollow cylindrical chuck actuator piston member, generally designated 184. The member 184 is slidably mounted within the header 164 and around the outer periphery of the shaft member 170. Mounted on the right end of the piston member 184 is a plurality of annular spacing members 186, 188 and 190, between which is supported a pair of annular sealing members 192 and 194, all of these members 186–194 being secured to the end of the piston 182 by a suitable retaining nut 196. As seen in FIGURE 3, the sealing members 192 and 194 divide the interior of the housing 162 into two chambers 198 and 200, these chambers being communicable through suitable fluid fittings 202 and 204 and conduits 206 and 208, respectively, to a source of fluid pressure (not shown) which serves to actuate the assembly 160, as will be described.

An ejecting rod 210 having a cup-shaped section 212 formed on the left end thereof extends coaxially through a central bore 214 formed in the shaft 170. The cup-shaped section 212 is arranged radially inwardly from the inner periphery of the dogs 174 and is adapted to engage the end of a tubular workpiece upon longitudinal movement of the assembly 160, whereby the rod 210 slides axially within the shaft 170 and tensions an ejection spring 213 mounted coaxially of the right end of the rod 210. At the end of the louvering cycle of the apparatus 10, the spring 213 serves to force the rod 210 toward the left and thus eject the tubular workpiece from the assembly 160, as will be described. A switching device, the operation of which will later be described, is associated with the assembly 160 to control the flow of actuating fluid pumped through the conduit 208 and fitting 204 and into the housing chamber 200, this fluid flow resulting in the piston member 184 moving to the left and, by virtue of the fact that the adjacent portion of the dogs 174 and the sleeve section 182 of the member 184 have mating tapering surfaces, the left ends of the dogs 174 will contract or be forced radially inwardly and rigidly secure the adjacent end of the tubular workpiece between the serrated inner peripheries thereof.

As seen in FIGURE 6, the header member 164 and 166 closing the opposite ends of the housing 162 extend laterally outwardly on the opposite sides thereof. Rigidly secured within the laterally outermost portions of the headers 164 and 166 are a plurality of sleeve bushings, generally designated 216, these bushings being longitudinally aligned and adapted to support the chuck or collet assembly 160 for sliding movement along a pair of spaced parallel support shafts 218 and 220 extending through the bushings 216. The shafts 218 and 220 are rigidly secured at their left ends by being compressed between the upper and lower die support members 148 and 142, respectively, together with suitable keyway members 222 and 224 that are affixed to the side of the lower die support member 142 by suitable bolts 226, as seen in FIGURE 7. The opposite or right ends of the shafts 218 and 220 are supported by a pair of suitable shaft support brackets 228 and 230 that are rigidly mounted on a horizontally extending support platform 232 extending transversely between and secured to the top of the upper frame members 14 and 16.

Figure 2:
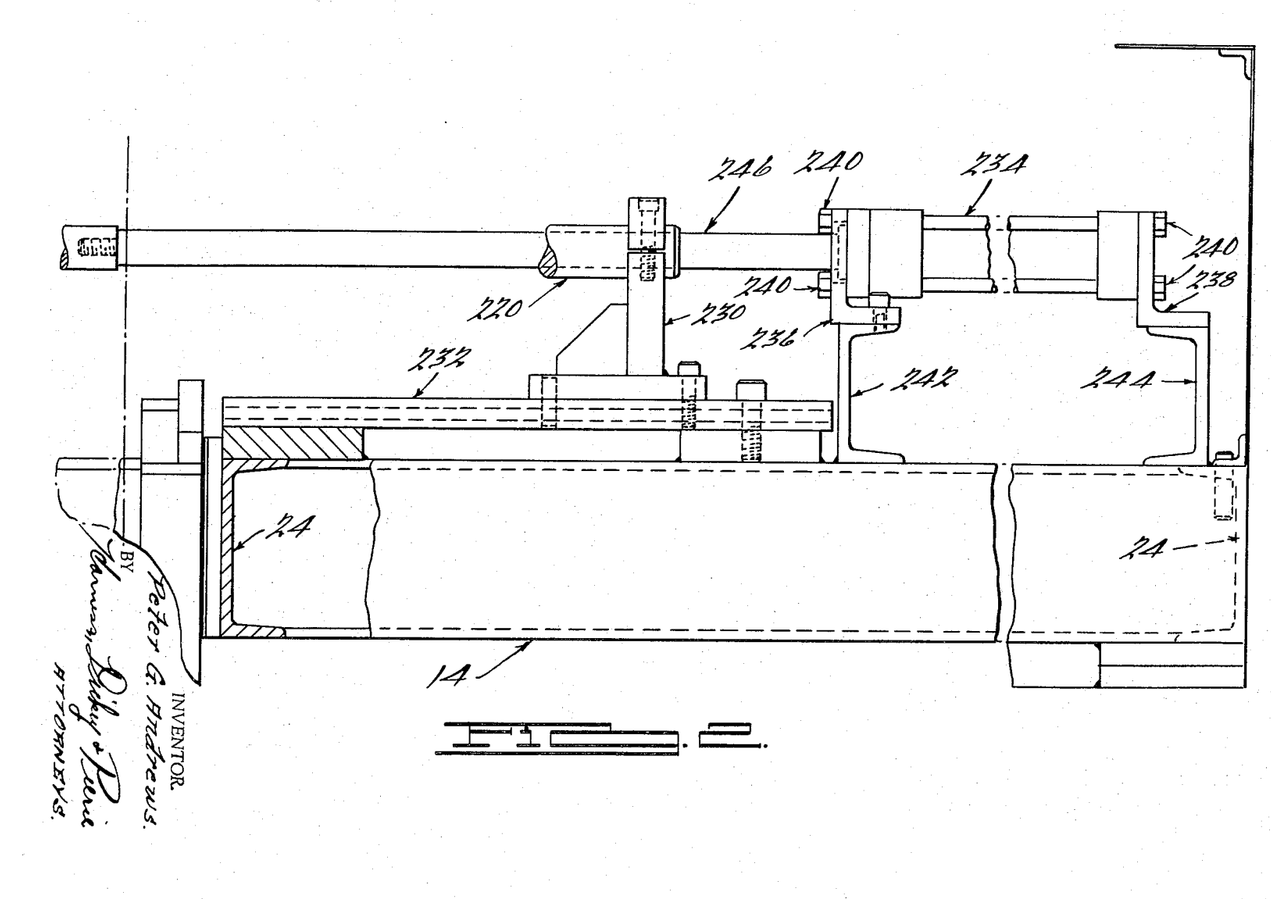
FIG. 2 is an enlarged side elevational view, partially broken away, of the right end of the tube louvering machine illustrated in FIGURE 1.

Means for biasing the chuck or collet assembly 160 along the support shafts 218 and 220 is provided through the use of a hydraulic piston and cylinder asesmbly, generally designated 234, that is disposed at the opposite end of the support structure 12 from the aforediscussed piston and cylinder assembly 34. As best seen in FIGURE 2, the assembly 234 is supported on the structure 12 by a pair of suitable brackets 236 and 238 that are secured to the opposite ends of the assembly 234 by suitable bolts 240 and are rigidly secured to the top of a pair of transversely extending and generally C-shaped support members 242 and 244, respectively, that are mounted on the top of the upper frame members 14 and 16. The assembly 234 includes a hydraulic actuated piston rod 246 which extends longitudinally of the apparatus 10 interjacent the collet or chuck assembly support shafts 218 and 220. The outer or left end of the piston rod 246 is connected to the header 166 by a pair of spaced coupling members 248 that are pivotably secured at one end to the adjacent end of the rod 246 by a suitable pivot pin 250 and are rigidly secured at their opposite ends to the header 166 by suitable bolts 252 and 254. Upon actuation of the assembly 234, the piston rod 246 is adapted to move longitudinally of the support shafts 218 and 220, thereby selectively biasing the chuck or collet assembly 160 along the support shafts 218 and 220, whereby a tubular workpiece supported within the assembly 160 may be indexed relative to the above described louvering arms 86 and die 150.

As best seen in FIGURE 1, the shaft 120 whose rotary movement effects rotation of the aforedescribed cam member 118 resulting in the selective actuation of the piston and cylinder assembly 34, is connected to a hydraulic fluid pumping mechanism, herein designated 254, which is supported on a transversely extending cross member 255 located subjacent the support platform 30. The assembly 255 is communicable through suitable fluid conduits (not shown) to the piston and cylinder assembly 234 and is adapted to effect actuation of the assembly 234 synchronized with the expanding and contracting movement of the louvering arms 86, as will be described.

Figure 10:
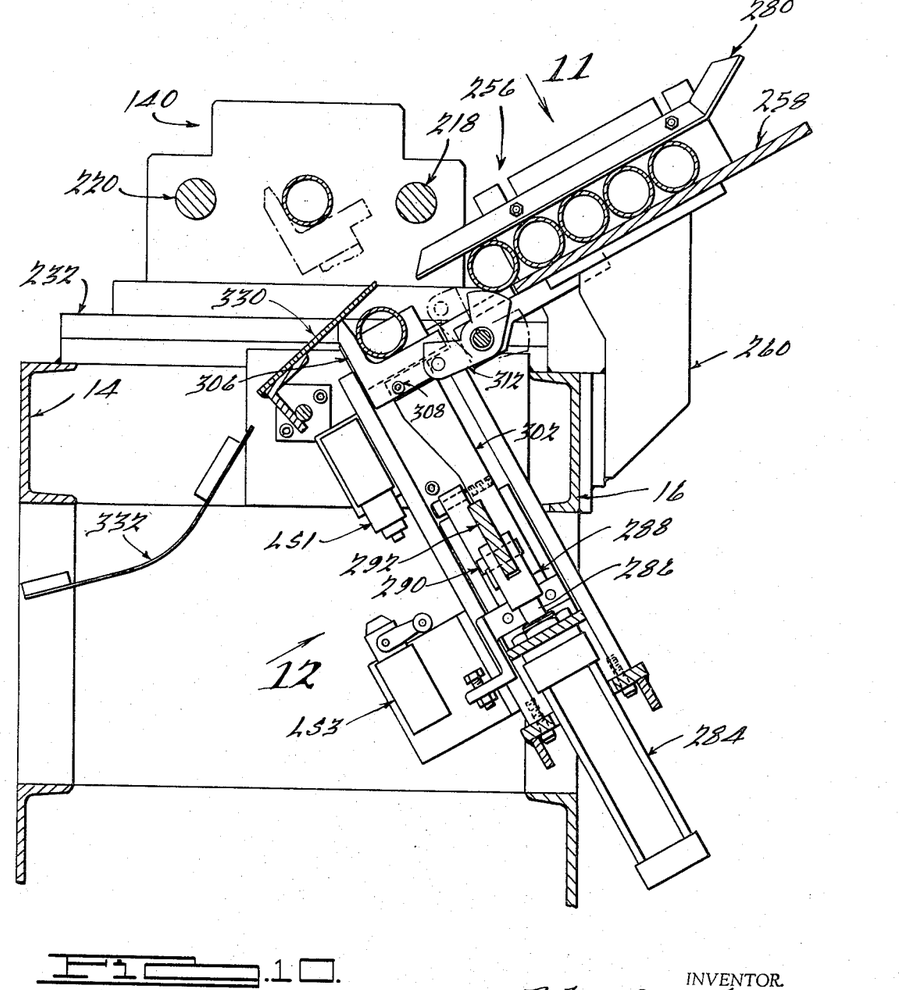
FIG. 10 is an enlarged transverse cross sectional view of the structure illustrated in FIGURE 1, taken along the line 10—10 thereof.
Figure 11:
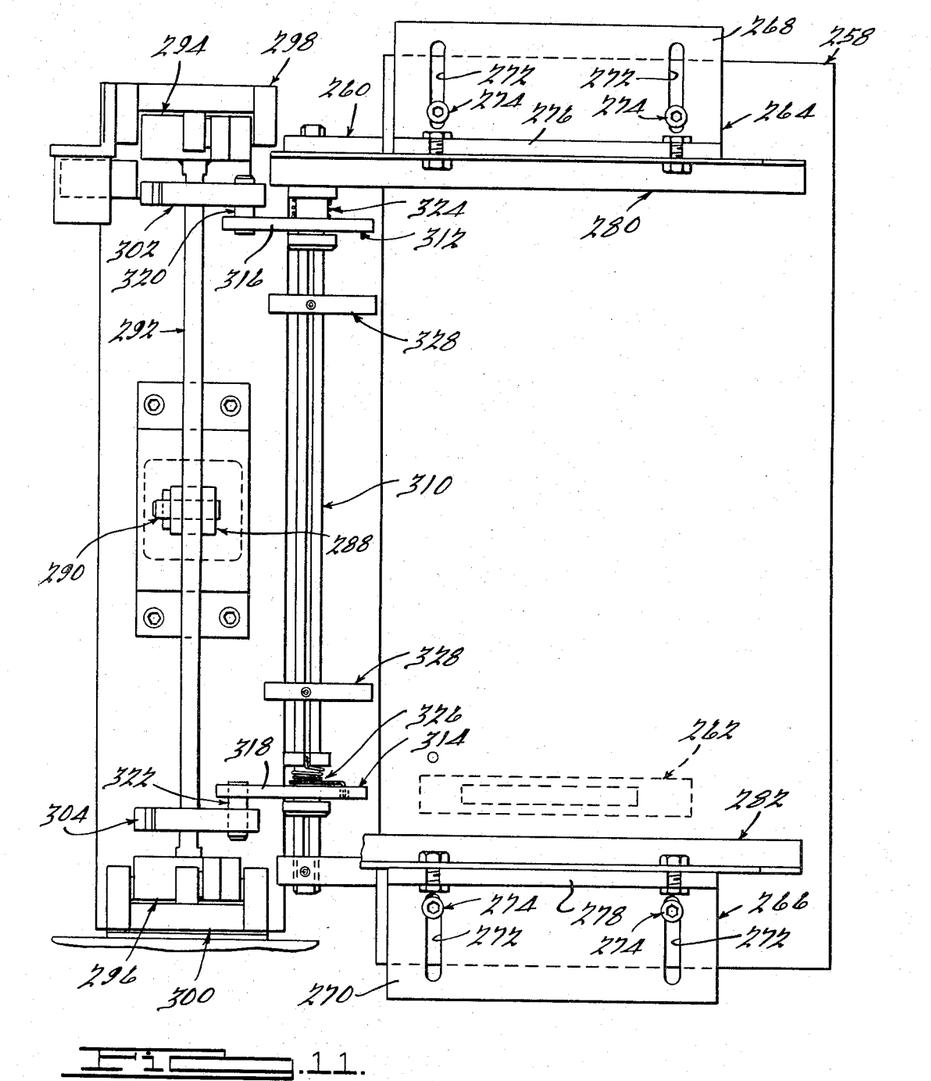
FIG. 11 is a top elevational view of the structure illustrated in FIGURE 10, as seen in the direction of the arrow 11 thereof.

Referring now to FIGURES 10 through 12, the apparatus 10 includes a tubular workstock magazine assembly 256 which is located adjacent the die 150 and within which tubular workstock is stored prior to being subjected to the louvering operation performed by the interaction of the expanding louvering arms 86 and die 150, as above described. As seen in FIGURE 10, the magazine assembly 256 comprises a flat or planar support platform 258 which is secured to the outboard side of the support structure 12 by a pair of brace members 260 and 262 and is oriented at an angle such that tubular workstock supported thereon may pass under the influence of gravity into a tubular workstock feeding mechanism which selectively elevates successive workpieces to a position where they may be engaged and supported by the hereinbefore described chuck or collet assembly 160. Located at the opposite ends of the platform 258 is a pair of end members 264 and 266 which respectively comprise flat lower sections 268 and 270 that are contiguously engaged with the upper surface of the platform 258. The sections 268 and 270 are formed with a plurality of elongated openings 272 through which suitable bolts 274 extend to secure the members 264 and 266 to the platform 258. As seen in FIGURE 11, the openings 272 are formed in the members 264 and 266 such that they may move toward and away from each other in accordance with the particular size (length) of the tubular workstock disposed therebetween. The end members 264 and 226 include upwardly extending sections 276 and 278, respectively, upon which is mounted a pair of channel or guide members 280 and 282 which, together with the end members 264, 266 and the upper surface of the platform 258, define a tubular workstock passage. The guide members 280 and 282 are adjustably mounted on the upwardly extending sections 276 and 280 of the members 264 and 266, as seen in FIGURE 10, whereby the distance between the upper surface of the support platform 258 and the lower edges of the guide members 280 and 282 may be varied in accordance with the outer diameter of the tubular workstock supported therebetween.

A pneumatically actuated piston and cylinder assembly, generally designated 284, is mounted on the side of the support structure 12 at an angle substantially perpendicular to the plane defined by the support platform 258 and is adapted to elevate successive workpieces stored within the magazine assembly 256 to a position whereby they may be engaged and supported by the chuck or collet assembly 160. The piston and cylinder assembly 284 includes a reciprocally mounted piston rod 286 whose outer end is secured by a suitable yoke member 288 and retaining pin 290 to a flat elongated slide member 292. Secured to the opposite ends of the member 292 is a pair of slideways 294 and 296 which are respectively slidably mounted within a pair of spaced parallel guide channels 298 and 300, respectively, located adjacent the opposite ends of the support platform 258, such that upon actuation of the piston and cylinder assembly 284, the slide member 292 will move upwardly and downwardly within and relative to the guide channels 298 and 300. A pair of tubular workstock elevating arms 302 and 304 are rigidly secured to the opposite ends of the slide member 292 directly inboard of the slideways 294 and 296 and each supports a generally L-shaped workstock retainer bracket 306 which is secured to the upper end of the arms 302 and 304 by suitable bolts 308. An elongated cylindrical shaft 310 extends between and is rigidly secured at its opposite ends of the brace members 260 and 262 securing the support platform 258 to the side of the support structure 12, the shaft 310 being located interjacent the inboard edge of the support platform 258 and the aforediscussed slide member 292, as illustrated in FIGURE 11. Pivotably mounted on opposite ends of the shaft 310 is a pair of generally L-shaped carriage members 312 and 314 which are formed with outwardly extending actuating sections 316 and 318, respectively. Mounted on the outer ends of the sections 316 and 318 are longitudinally extending actuating pins 320 and 322, respectively, which are engageable with the workstock retainer brackets 306, as representatively in FIGS. 10 and 11. The carriage members 312 and 314 are spring-loaded through the use of suitable coil springs 324 and 326, respectively, to the position illustrated by the phantom lines in FIGURE 10, whereby the actuating sections 316 and 318 thereof serve to prevent tubular workstock stored within the magazine assembly 256 from rolling downwardly off from the inboard end of the support platform 258. Rigidly secured to the shaft 310 adjacent to the carriage members 312 and 314, respectively, is a pair of slide plates, generally designated 328, which enable tubular workstock supported within the assembly 256 to slide freely from the platform 258 onto the retainer brackets 306 mounted on the upper ends of the elevating arms 302 and 304.

Upon actuation of the piston and cylinder assembly 284, the piston rod 286, together with the elongated slide member 292, will move upwardly, thereby elevating the workstock retaining brackets 306 on the arms 302 and 304, along with the tubular workpiece supported within the brackets 306. The arms 302 and 304 will elevate the brackets 306 and the subject workpiece to the position illustrated in phantom lines in FIGURE 10, whereby the end of the workpiece adjacent the chuck or collet assembly 160 will be engaged and supported thereby for subsequent indexing relative to the expandable lowering arms 86 and die 150, as will hereinafter be described. After the workpiece has thus been engaged by the chuck or collet assembly 160, the piston and cylinder assembly 234 is energized (through suitable controls hereinafter to be described), at which time the piston and cylinder assembly 284 is deenergized causing the slide member 292 and elevating arms 302 and 304 to move downwardly. As the arms 302 and 304 move downwardly, the retainer brackets 306 engage the pins 320 and 322 of the carriage members 312 and 314, thereby biasing the members 312 and 314 to the position illustrated by the solid lines in FIGURE 10. As the carriage members 312 and 314 are thus biased, the forward or lowermost tubular workpiece supported within the magazine assembly 256 rolls downwardly on to the retainer brackets 306. When the members 312 and 314 are biased to the position permitting a tubular workpiece to slide onto the brackets 306, the ends of the members 312 and 314 opposite the actuating sections 316 and 318 thereof project upwardly into the magazine assembly 256 thereby preventing more than a single tubular workpiece from sliding downwardly onto the brackets 306. At the appropriate time in the operational sequence of the apparatus 10, the piston and cylinder assembly 284 will be reenergized, whereby the arms 302 and 304 will again be elevated to raise the next successive workpiece upwardly, as above described. As the brackets 306 move upwardly, the carriage members 312 and 314 are biased by the springs 324 and 326 to the position indicated in phantom lines in FIGURE 10, thereby preventing the workpieces supported within the magazine assembly 256 from sliding downwardly, as above described.

At the end of each louvering cycle, the tubular workpiece which has just been louvered is disengaged by the chuck or collet assembly 160 and thereafter drops downwardly into a suitable receptacle such as a conventional tote box or the like, the downward movement of the workpiece being controlled by a suitable guide plate 330 and discharge tray or trough 332, as seen in FIGURE 10.

The operation of the tube louvering apparatus 10 of the present invention will now be described with particular reference being made to the schematic diagram illustrated in FIGURE 13 indicating the solenoids and limit switches controlling the energization and deenergization of the various hereinbefore described piston and cylinder assemblies 34, 234 and 284.

Assuming the initial conditions that each of the piston and cylinder assemblies 34, 234 and 284 have their respective piston rods 38, 246 and 286 in a retracted position, a starter button (not shown) in the energizing circuit of the apparatus 10 is actuated, whereby a solenoid $S_1$ in operative association with the pneumatic piston and cylinder assembly 284 is energized to effect actuation of the magazine assembly 256. Upon energization of the assembly 284, the tubular workstock retainer brackets 306 are biased upwardly thereby elevating a tubular workpiece in a manner hereinbefore described. At the end of the loading or elevating stroke, a limit switch $LS_1$ that is mounted on the inboard side of the guide channel 298 (see FIGURE 10), is actuated, thereby effecting energization of a second solenoid $S_2$ which is in operative association with the hydraulic piston and cylinder assembly 234 and causes the piston rod 246, together with the chuck or collet assembly 160, to move toward the left. After the piston rod 246 and assembly 160 have moved a predetermined distance to the left (approximately 2 to 3 inches), an actuating lever 354 that is adjustably secured to the outboard side of the housing 162 engages a limit switch $LS_2$ that is mounted on the top of the platform 232 adjacent to the support shaft 220, whereby the solenoid $S_2$ is deenergized to stop the advance of the piston rod 246 and the assembly 160. Actuation of the limit switch $LS_2$ also serves to energize a solenoid $S_3$ which controls the flow of hydraulic fluid to and from the housing 162 of the assembly 160, causing the piston member 184 to move to the right whereby the workstock engaging dogs 174 will expand to receive the adjacent end of a tubular workpiece. Actuation of the limit switch $LS_2$ also functions to deenergize the solenoid $S_1$ and energize an associated solenoid $S_4$ which serves to retract the piston rod 286 into the piston and cylinder assembly 284 and thereby lower the workstock elevating arms 302 and 304. As the piston rod 286 is thus lowered, a limit switch $LS_3$ that is mounted on the lower end of the guide channel 298 (see FIGURE 10) is actuated, whereby the solenoid $S_2$ is reenergized to effect continued forward movement of the piston rod 246 and chuck or collet assembly 160 toward the left.

As the assembly 160 advances toward the left, the lever 354 engages and closes another limit switch $LS_4$ that is mounted on the top of the support platform 232, the switch $LS_4$ being maintained in a closed position until a predetermined time in the cycling operation, as will be described. At the end of the advance stroke of the piston rod 246, the lever 354 engages and actuates another limit switch $LS_5$ which is also mounted on the top of the support platform 232. As the switch $LS_5$ is thus actuated, the solenoid $S_2$ is deenergized to terminate the leftward movement of the piston rod 246 and chuck or collet assembly 160 and simultaneously actuates a solenoid $S_5$ which is in operative association with solenoid $S_2$ and the piston and cylinder assembly 234, thereby initiating the indexing cycle of the apparatus 10.

When the indexing cycle begins, the piston rod 246, together with the chuck or collet assembly 160, is biased to the right in predetermined incremental amounts, the exact distances depending upon the axial spacing between the adjacent louvers to be formed in the tubular workstock. The assembly 160 continues to move toward the right until the limit switch $LS_4$ is engaged and actuated, whereby a solenoid $S_6$ in operative association with the piston and cylinder assembly 34 is energized to effect reciprocal movement of the piston rod 38 and hence expansion and retraction of the louvering arms 86, as hereinbefore described. The louvering and indexing operations of the piston and cylinder assemblies 34 and 234 continue until the limit switch $LS_4$ is disengaged by the lever 354 and thus deactuated, whereby the solenoid $S_6$ is deenergized and the louvering portion of the operation is terminated; however, the indexing of the piston rod 246, together with the chuck or collet assembly 160 and the tubular workpiece supported therein, continues until a limit switch $LS_6$, which is also mounted on the support platform 232 adjacent the support shaft 220 is engaged by the lever 354 and actuated. As the limit switch $LS_6$ is thus actuated, the solenoid $S_4$ is deenergized and the indexing cycle is terminated. Occurring simultaneously with the deenergization of the solenoid $S_4$ is deenergization of solenoid $S_3$, whereby the tubular workstock engaging dogs 174 will expand in the chuck or collet assembly 160 enabling the rod 210 to eject the tubular workpiece which will then drop downwardly into a suitable receptacle located below the apparatus 10. The solenoid $S_1$ effecting operation of the pneumatic piston and cylinder assembly 284 is also energized as the limit switch $LS_6$ is actuated, whereby the workstock elevating arms 302 and 304 will elevate the next successive tubular workpiece to be lowered. At the end of the load stroke, the switch $LS_1$ is again engaged and actuated, thereby effecting the next successive operational cycle of the apparatus 10, as hereinabove described.

While it will be apparent that the preferred embodiment herein illustrated is well calculated to fulfill the objects above stated, it will be appreciated that the tube louvering apparatus 10 of the present invention is susceptible to modification, variation and change without departing from the proper scope or fair meaning of the subjoined claims.

What is claimed is:

1. In a tube louvering apparatus, a mandrel adapted to be inserted within tubular workstock for the support thereof, means on said mandrel including a plurality of longitudinally extending and circumferentially spaced louvering arms, said arms being pivotally secured at one end to said mandrel, louvering teeth formed on each of said arms, a louvering die arranged circumjacent said teeth and cooperable therewith to form louvers in tubular workstock supported on said mandrel, means for biasing said louvering arms toward said die, and means for moving the tubular workstock longitudinally relative to said die, said louvering die having longitudinally extending recesses formed therein adjacent each of said arms into which the material is deformed upon the operation of said means for biasing said louvered arms toward said die, said recesses extending longitudinally through said die for free longitudinal movement of the louvered tubular workstock through said die upon the operation of the last named means without retraction of said die.

2. In a tube louvering apparatus, and an expandable mandrel adapted to be inserted within tubular workstock for forming louvers therein, means for expanding a portion of said mandrel, and means including a movably mounted chuck assembly selectively engageable with the tubular workstock and adapted to move the workstock relative to said mandrel, said assembly comprising a plurality of circumferentially spaced workstock engaging dogs, a sleeve encircling said dogs, means for biasing said dogs into engagement with a contracting surface of said sleeve circumjacent said dogs, said assembly further comprising piston and cylinder means and means coupling said last mentioned means to said contracting sleeve to said sleeve for reciprocating said sleeve, said counteracting surface of said sleeve and said dogs having an inclined relationship for moving said dogs in a manner such that said dogs are lockingly engaged with the tubular workstock upon operation of said piston and cylinder means.

3. The invention as set forth in claim 2 which includes piston and cylinder means coupled to said assembly incrementally toward said mandrel and for retracting said assembly in a single step away from said mandrel.

4. In a tube louvering apparatus, an elongated cylindrical mandrel adapted to be inserted within tubular workstock for the support thereof, means including a plurality of circumferentially spaced louvering arms pivotally secured to the periphery of said mandrel, a louvering die arranged circumjacent said arms and cooperable therewith to form a series of louvers in the workstock, a longitudinally slidable shaft extending through said mandrel, means on said shaft for biasing said arms toward said louvering die, and power means for effecting sliding movement of said shaft, said recesses extending longitudinally through said die for free longitudinal movement of the louvered tubular workstock through said die without retraction of said die.

5. In a tube louvering apparatus, an elongated cylindrical mandrel adapted to be inserted within tubular workstock for the support thereof, means including a plurality of circumferentially spaced louvering arms pivotally secured to the periphery of said mandrel, a louvering die arranged circumjacent said arms and cooperable therewith to form a series of louvers in the workstock, a longitudinally slidable shaft extending through said mandrel, means on said shaft for biasing said arms toward said louvering die, power means for effecting sliding movement of said shaft, and means including chuck means selectively engageable with the workstock supported on said mandrel for indexing the workstock longitudinally relative thereto said louvering die having longitudinally extending recesses formed therein adjacent each of said arms into which the material is deformed upon the operation of said means for biasing said louvered arms toward said die, said recesses extending longitudinally through said die for free longitudinal movement of the louvered tubular workstock through said die upon the operation of the last named means without retraction of said die.

6. In a tube louvering apparatus, an elongated cylindrical mandrel adapted to be inserted within tubular workstock for the support thereof, means including a plurality of circumferentially spaced louvering arms pivotally secured to the periphery of said mandrel, a louvering die arranged circumjacent said arms and cooperable therewith to form a series of louvers in the workstock, a longitudinally slidable shaft extending through said mandrel, means on said shaft for biasing said arms toward said louvering die, power means for effecting sliding movement of said shaft, and means for moving the workstock longitudinally relative to said mandrel comprising a collet assembly selectively engageable with one end of the workstock supported on said mandrel, said assembly comprising a plurality of tubular workstock engaging dogs, a collar encircling at least a portion of said dogs, said collar and said dogs having cooperating inclined surfaces for effecting radial movement of said dogs upon reciprocation of said collar and means for reciprocating said collar for expanding and contracting said dogs into and out of engagement with the workstock, said recesses exteding longitudinally through said die for free longitudinal movement of the louvered tubular workstock through said die without retraction of said die.

7. In a tube louvering apparatus, an elongated cylindrical mandrel adapted to be inserted within tubular workstock for the support thereof, means including a plurality of circumferentially spaced louvering arms pivotally secured to the periphery of said mandrel, a louvering die arranged circumjacent said arms and cooperable therewith to form a series of louvers in the workstock, a longitudinally slidable shaft extending through said mandrel, means on said shaft for biasing said arms toward said louvering die, power means for effecting sliding movement of said shaft, and means including a moveably mounted chuck assembly selectively engageable with tubular workstock and adapted to move the workstock longitudinally relative to said mandrel, said assembly comprising a plurality of circumferentially spaced workstock engaging dogs which are resiliently urged outwardly into engagement with a contracting surface of a sleeve circumjacent said dogs, said counteracting surface of said sleeve and said dogs comprising inclined surfaces for effecting radial movement of said dogs upon reciprocation of said sleeve, said assembly further comprising piston and cylinder means, and means coupled to said piston and cylinder means to said sleeve for reciprocating said sleeve and moving said dogs radially into engagement with a tubular workstock, said recesses extending longitudinally through said die for free longitudinal movement of the louvered tubular workstock through said die without retraction of said die.

8. A tube louvering apparatus as set forth in claim 7 wherein the means on the shaft for biasing the arms towards the louvering die comprises an expanding cone having an inclined surface coacting with said arms.

9. A tube louvering apparatus as set forth in claim 8 wherein the louvering arms further include outwardly projecting louvering teeth formed on the outer end thereof.

10. A tube louvering apparatus comprising a mandrel, louver forming means juxtaposed to said mandrel for forming louvered openings in a tube supported around said mandrel, work holding chuck means adapted to engage and hold a tube to be formed, work feeding means associated with said chuck means for moving said chuck means intermittently from a retracted position to an extended position in a plurality of steps for presenting successive longitudinally spaced portions of the tube to said louver forming means and for retracting said chuck from its extended position to said retracted position for removal of a louvered tube from said chuck means, and conveying means disposed between said mandrel and the retracted position of said chuck means for selectively presenting a tube to said chuck means for engagement thereby and for removing a louvered tube from said chuck means after said chuck means has moved from its retracted position to its extended position and has returned to its retracted position.

11. A tube louvering apparatus as set forth in claim 10 wherein the louver forming means comprises a plurality of forming members supported for reciprocation relative to the mandrel and means for reciprocating said forming members.

12. A tube louvering apparatus as set forth in claim 11 wherein the means for reciprocating the forming members is sequentially operated at the end of each indexing step of the work feeding means.

13. A tube louvering apparatus as set forth in claim 10 wherein the conveying means comprises inclined ramp means disposed on one side of said apparatus and upon which unlouvered tubular workpieces are adapted to be stacked in side-by-side relationship, carriage means pivotally supported at the lower end of said ramp means, said carriage means having a pair of outstanding arms adapted to receive one tubular workpiece therebetween when said carriage means is in a first angular position, one of said arms having means formed thereon for precluding gravity feed of the tubular workpieces from said ramp means when said carriage means is in its second angular position, a feed device, means for reciprocating said feed device from a retracted position wherein a tubular workpiece is transferred from between said arms of said carriage means to said feed device to an extended position wherein the tubular workpiece is presented to the chuck means, means for pivoting said carriage means upon movement of said feed device for sequentially transferring tubular workstocks from said inclined ramp means to said feed device, a guide plate positioned beneath said chuck means and disposed in overlying relationship to said feed device when said feed device is in its receiving position for deflecting a louvered tubular workstock to a take off chute when the louvered tubular workstock is released from said chuck means, and means for pivoting said guide plate upon movement of said feed device.

References Cited

UNITED STATES PATENTS

| | | | |
|---|---|---|---|
| 317,601 | 5/1885 | Welker | 214—1 |
| 750,746 | 1/1904 | Woodburn | 83—191 |
| 1,648,060 | 11/1927 | Rowe | 29—156.8 |
| 1,693,011 | 11/1928 | Woodward | 29—163.5 |
| 2,147,363 | 2/1939 | Boyer | 29—163.5 |
| 2,963,069 | 12/1960 | Pasternak | 72—311 |
| 2,991,892 | 7/1961 | De Haas | 214—1 |
| 3,180,127 | 4/1965 | Rice | 72—391 |

RICHARD J. HERBST, *Primary Examiner.*

E. M. COMBS, *Assistant Examiner.*